United States Patent
Vitale et al.

(10) Patent No.: US 7,086,764 B2
(45) Date of Patent: Aug. 8, 2006

(54) GLARE RESISTANT DISPLAYS FOR AUTOMOTIVE VEHICLES AND LENSES FOR SUCH DISPLAYS

(75) Inventors: Nicholas A. Vitale, Fraser, MI (US); James F. Szatkowski, Sterling Ht., MI (US); Robert R. Kubiak, Macomb, MI (US)

(73) Assignee: General Motors Corporation, Detroit, MI (US)

( * ) Notice: Subject to any disclaimer, the term of this patent is extended or adjusted under 35 U.S.C. 154(b) by 115 days.

(21) Appl. No.: 10/874,091

(22) Filed: Jun. 22, 2004

(65) Prior Publication Data

US 2005/0278996 A1 Dec. 22, 2005

(51) Int. Cl.
*B60Q 1/00* (2006.01)
*G01D 11/28* (2006.01)

(52) U.S. Cl. .................... 362/489; 362/23; 362/28; 362/29

(58) Field of Classification Search ............... 362/327, 362/28, 29, 489, 361, 509
See application file for complete search history.

(56) References Cited

U.S. PATENT DOCUMENTS

| | | | | |
|---|---|---|---|---|
| 5,821,867 A | * | 10/1998 | Angell et al. | 340/815.45 |
| 6,913,365 B1 | * | 7/2005 | Masaki et al. | 362/627 |
| 2003/0210535 A1 | * | 11/2003 | Gaides | 362/23 |
| 2005/0078485 A1 | * | 4/2005 | Kraus et al. | 362/489 |

* cited by examiner

Primary Examiner—Renee Luebke
Assistant Examiner—Julie A. Shallenberger
(74) Attorney, Agent, or Firm—Laura C. Hargitt (57) ABSTRACT

A glare resistant display for automotive vehicles has a lens with horizontal grooves which deflect reflections of external light sources, such as sun light, away from drivers while allowing illumination from behind the lens to pass therethrough so as to be visible to drivers. Indicia is disposed on the front face of the lens and a pointer pivots behind the front face. The indicia and pointer are made distinct because they block or absorb portions of the illumination coming from behind the lens. By utilizing lenses which minimize reflection, dials of instrument panels can be moved further toward steering wheels and drivers, thereby releasing space behind the dials for other uses.

22 Claims, 7 Drawing Sheets

GLARE RESISTANT DISPLAYS FOR AUTOMOTIVE VEHICLES AND LENSES FOR SUCH DISPLAYS

FIELD OF THE INVENTION

The present invention relates to glare resistant displays for automotive vehicles and lens for such displays. More particularly, the present invention relates to glare resistant displays for automotive vehicles and lenses for such displays, wherein the displays minimize reflection of exterior light such as sunlight toward occupants of automotive vehicle passenger compartments.

BACKGROUND OF THE INVENTION

As automotive vehicles evolve, there is a continuing need to efficiently utilize space within the vehicles. Many spaces serve specific purposes, however if those purposes can still be served without consuming spaces then the spaces can be used for other purposes. This facilitates automotive design and progress.

It is desirable to minimize both day and night reflections that cause specular glare from automotive instrument panels. In addition, it is desirable to minimize or eliminate reflections which appear on windshields or side windows. This is currently accomplished by recessing dial planes of automotive instrument clusters under prominent instrument panel brows behind concave cluster lenses. Recessing requires hundreds of square millimeters of empty space in front of the dial planes, thus consuming packaging space. Since there is a need in automotive vehicles to effectively utilize space, it is desirable to release allocations of this empty space for other purposes, while still minimizing reflections and glare.

SUMMARY OF THE INVENTION

In view of the aforementioned considerations, this invention is directed to a display for conveying to an observer in an automotive vehicle, information relating to detected parameters associated with selected conditions occurring within the vehicle. The display comprises a case having a front side and a back side and having therein at least one indicator for selecting at least one portion of a detected parameter. A lens having front and rear faces covers the front side of the case. The lens has a light defusing surface constructed and arranged to minimize reflections of light therefrom toward an observer in the vehicle while allowing illumination to pass through the lens from behind the lens. Indicia associated with the parameters being monitored is disposed on one of the faces of the lens and absorbs at least a portion of the illumination to render the indicia distinct. The indicia is located in proximity with the indicator.

In a further aspect of the invention the indicia is on the front face of the lens.

In still a further aspect of the invention, the light diffusing surface is on the front face of the lens.

In still a further aspect of the invention, the light diffusing surface comprises an array of adjacent grooves extending substantially horizontally when the display is mounted in the vehicle and is constructed and arranged to transmit light from behind the lens therethrough, and to reflect light exterior of the case away from the observer of the display.

In still a further aspect of the invention, the adjacent grooves are in one embodiment actuate, having reflecting portions which reflect sunlight outwardly and downwardly away from the observer, while transmitting light therethrough in substantially parallel beams. In another embodiment of the invention the aforementioned grooves are angular notches.

In still a further aspect of the invention a mounting arrangement is included for the display which orients at least the lens covering of the case at an acute angle with respect to vertical.

In still a further aspect of the invention, the front face of the lens is planar.

In still a further aspect of the invention, the indicator is a pointer and the indicia is comprised an array of numbers on the front surface of the lens. In another embodiment of the invention the indicia is a graphic display and the indicator is a cursor. In accordance with still another embodiment of the invention, the display conveys at least information relating to engine RPM and vehicle road speed.

In still a further aspect of the invention, a lens for use with a display in an automotive vehicle has a light diffusing surface formed in a front face of the lens comprising an array of adjacent grooves extending substantially horizontally when the lens is mounted in the automotive vehicle. The lens is constructed and arranged to transmit illumination from behind the lens therethrough, as well as to reflect light from in front of the front face away from the observer of the instrument panel.

In still a further aspect of the invention, indicia is disposed on the front face of the lens and is made visually distinct by the illumination.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION

Figure 1:
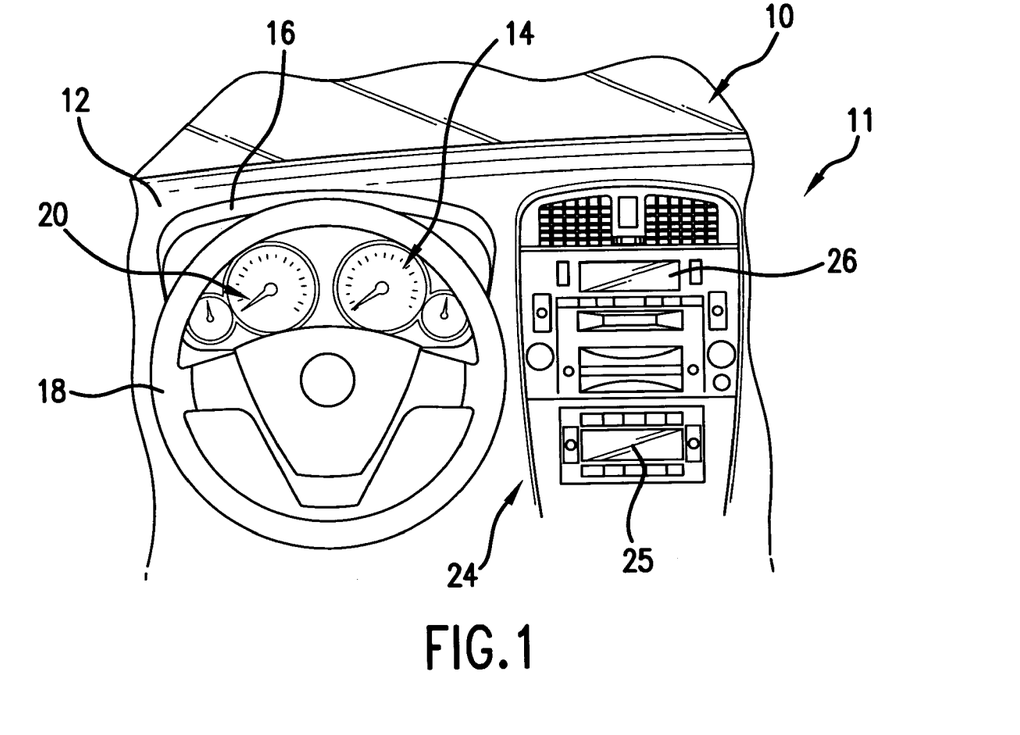
FIG. 1 is a planar view of a dash in an automotive vehicle.

Referring now to FIG. 1 there is shown a front portion 10 of a passenger compartment 11 of an automotive vehicle having a dash 12 with an instrument cluster 14, which is configured in accordance with the principles of the present invention. The instrument cluster 14 is shielded by a brow 16 and is positioned behind a steering wheel 18 having a gap 20 between the spokes thereof. The instrument cluster 14 is visible through the gap 20 to the driver of the vehicle who is the main observer of the instrument cluster.

Figure 2:
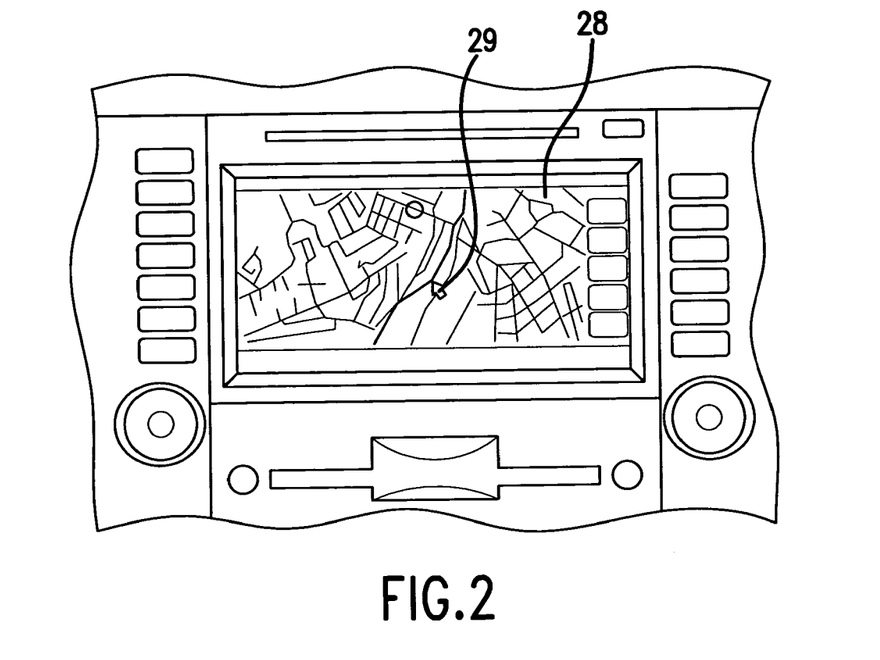
FIG. 2 is a planar view of a graphic display in the dash in an automotive vehicle.

Disposed on the dash 12 adjacent to the instrument cluster 14 and wheel 18 is another array of instruments 24 which may include graphic displays such as an HVAC display 25 and an audio system display 26. The instrument panel 24 may also include displays such as a GPS display 28 (FIG. 2).

Since the instrument cluster 14, HVAC display 25, audio information display 26 and GPS display 28 with a cursor 29 have transparent lenses, these displays reflect exterior light such as sunlight, passenger compartment light and various road illuminations toward the eyes of the driver of the vehicle. Moreover, if these displays are not properly configured and positioned, they can reflect onto and appear in the windshield of the vehicle. In accordance with a principle of the present invention, the displays on the instrument cluster 14, and/or the HVAC display 25, the audio display 26 and the GPS display 28 are configured to minimize both day and night reflections.

Figure 3:
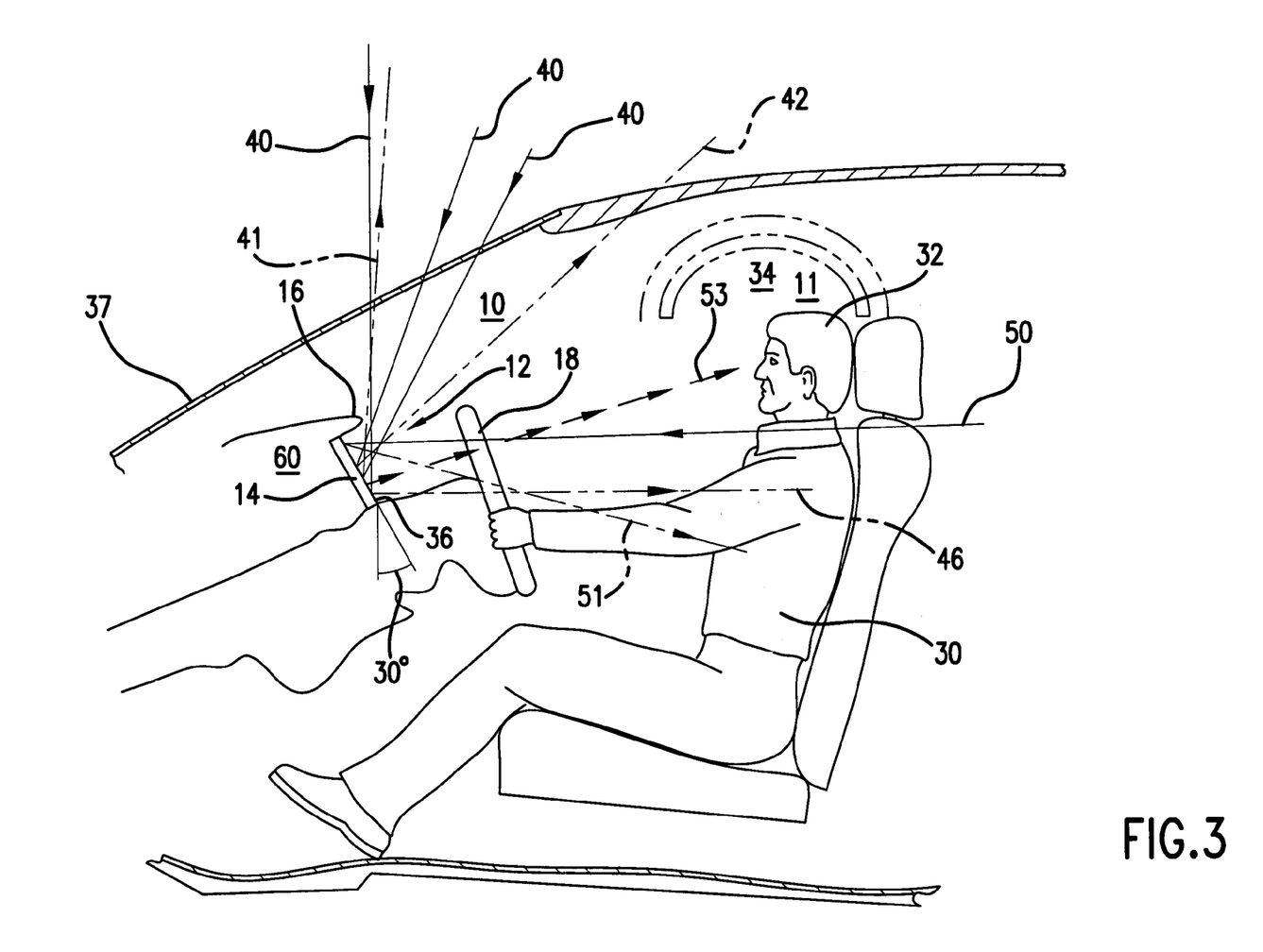
FIG. 3 is a side elevation of an automotive compartment including a display configured in accordance with the principles of the present invention.

Referring now to FIG. 3, there is shown a driver 30 sitting in the passenger compartment 11 and observing the instrument cluster 14 on the dash 12. The head 32 of the driver 30 is in most situations positioned in an area 34 behind and above the steering wheel 18. In accordance with the present invention, the instrument cluster 14 has a lens 36 that minimizes reflections of exterior light such as beams of sunlight 40 passing through the windshield 37 and into the passenger compartment 11 of the automotive vehicle. As is seen in FIG. 3, the sunlight 40 is reflected either in front of and above the space 34 occupied by the driver's head 32, as illustrated by sun beam reflections 41 and 42, or below the space 34, as indicated by the sun beam reflections 46. Light beams transmitted through the rear window, side windows or from within the passenger compartment 10, as represented by light beam 50, are reflected downwardly away from the space 34 as represented by the light beam reflection 51.

In accordance with the present invention, illumination 52 passing through the lens 36 is substantially normal to the surface of the lens so that indicia in the path of illumination are observable by the driver 30.

In the illustrated embodiment, the lens 36 is preferably at an angle of about 30° with respect to the vertical. As illustrated, it is preferable that the instrument cluster 14 have a thickness that is minimal, but which can be substantially the same as the thickness of current instrument clusters so that currently available instrument clusters are readily utilized with alterations being substantially made only to the lenses thereof.

In accordance with the principles of the present invention, space is made available at a location 60 disposed behind the instrument cluster 14. The free space at location 60 is created by setting the instrument cluster 14 of the present invention further rearward under the brow 16 on the dash 12, toward the steering wheel 18. By positioning the instrument cluster 14 further toward the steering wheel 18 by a distance of about 200 mm, hundreds of empty square millimeters are provided in the space at location 60, which space is usable for other purposes.

Referring now to FIGS. 4–7 where the instrument cluster 14 is shown in several views, it is seen that the instrument cluster comprises a case 65 having therein displays such as a tachometer dial 66 and a speedometer dial 68. The instrument cluster 14 may also include other displays such as a clock 70 and a fuel gauge 72. In addition, the instrument cluster 14 may include further displays, such as turn signals and driving light indicators 74, oil and temperature tale tales 75, and odometers. The tachometer 66 and speedometer 68 in the illustrated embodiment have pointers, such as pointers 76 and 77, respectively, which pointers are mechanical arms that align with numeric indicia 78 and 79. However, in other embodiments the pointers may be optical beam pointers, or any other kind of indicators or illuminators.

The case 65 has a rim 80 which projects from a back wall 82 to form an enclosure for the instruments covered by the lens 36. As is seen in FIGS. 4–7, the lens 36 preferably appears to be flat and therefore planar. As is particularly illustrated in FIG. 7, at least the lens 36 makes an angle of about 30° with the vertical. In the illustrated embodiment, the casing 65 is mounted in the dash 12 at an angle of about 30° to orient the lens at about 30° with the vertical.

Figure 8:
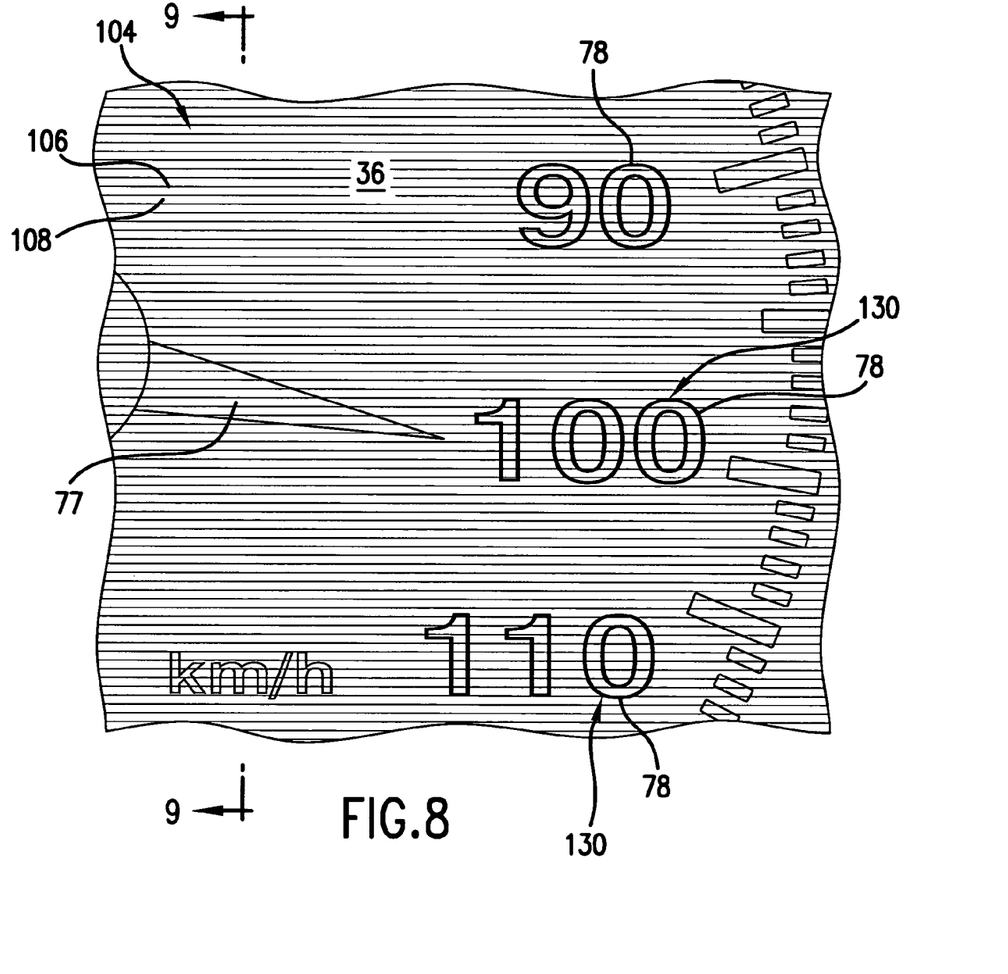
FIG. 8 is an enlarged planar view of a portion of a speedometer dial with a grooved lens surface having enlarged grooves superimposed thereover.
Figure 9:
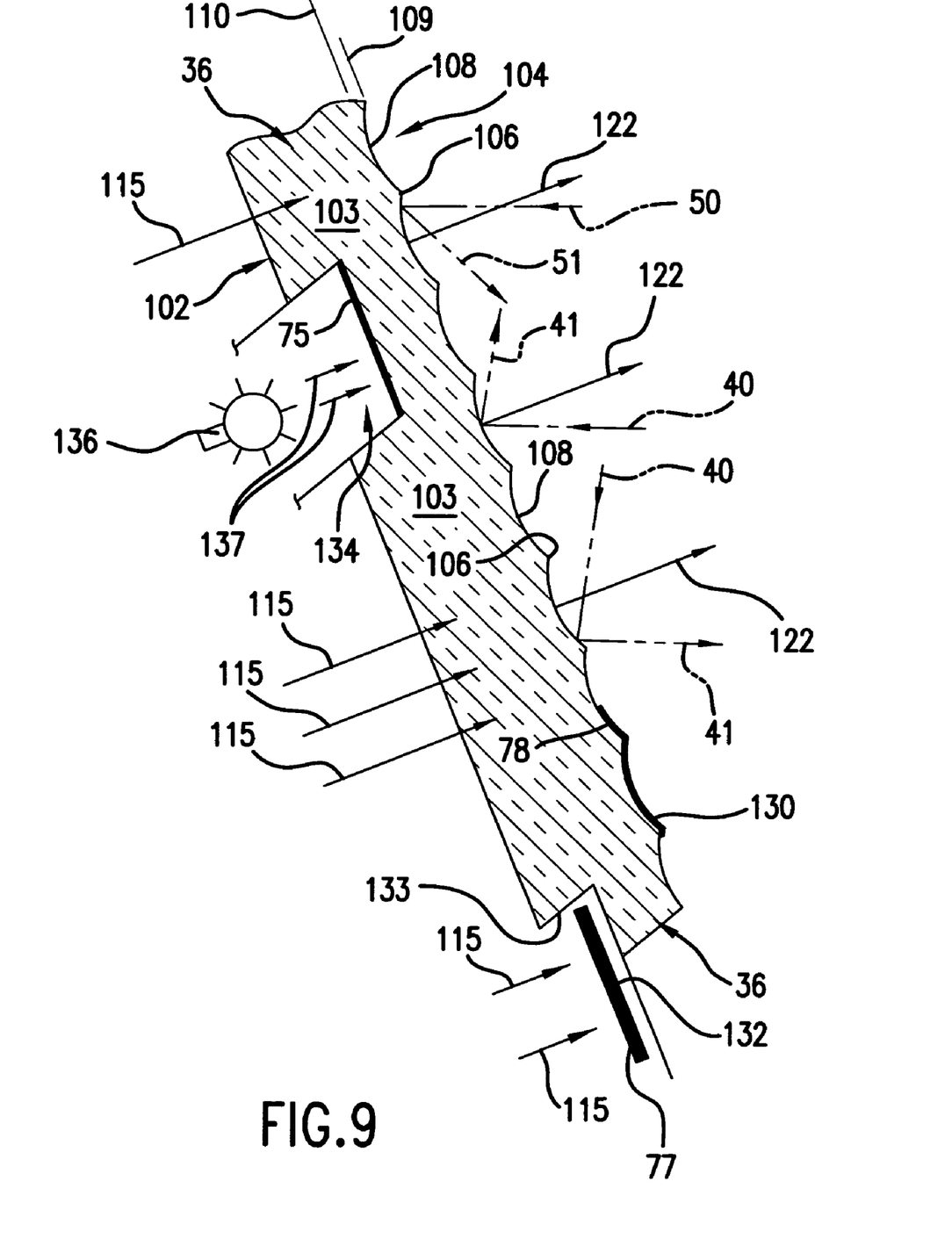
FIG. 9 is a side elevation taken along lines 9—9 of FIG. 8, showing a portion of a dial of FIG. 8.

Referring now to FIGS. 8 and 9, where a portion of the lens 36 is shown enlarged, it is seen that the lens 36 has a front face 100 and a rear face 102 defining a transparent body 103 therebetween. In FIG. 8, the front face 100 is shown as having an array of parallel arcuate grooves 104 formed therein. The grooves 104 extend horizontally when the lens is mounted in an automotive vehicle and the grooves have peaks 106 defined by lines of intersection of the grooves, as well as valleys 108 at the bottoms of the grooves. The points of the peaks 108 occur in a common plane 109 and the bottoms the valleys 108 occur in a common plane 110.

Incident external light rays 40 and 50 (see FIG. 3) are reflected by the curvature of the groove walls either upwardly away from the driver's head space 34 (see FIG. 3) or downwardly away from the driver's head space, generally in the direction of arrows 41, 42, 46 and 51 (FIG. 3). Since the valleys 108 of the grooves 104 have bottoms which are tangent to the common plane 109, illumination 115 passing through the transparent body 103 of the lens 36 from behind the rear surface 102 of the lens is transmitted through the front face 100 of the lens to emerge as substantially parallel light rays 122. The parallel rays 122 are generally directed toward the area 34 where the driver's head 32 is positioned in FIG. 3, and are readily observable by the driver 30 with minimal interference from specular light 40 or 50 from the sun and/or other exterior light sources.

Figure 4:
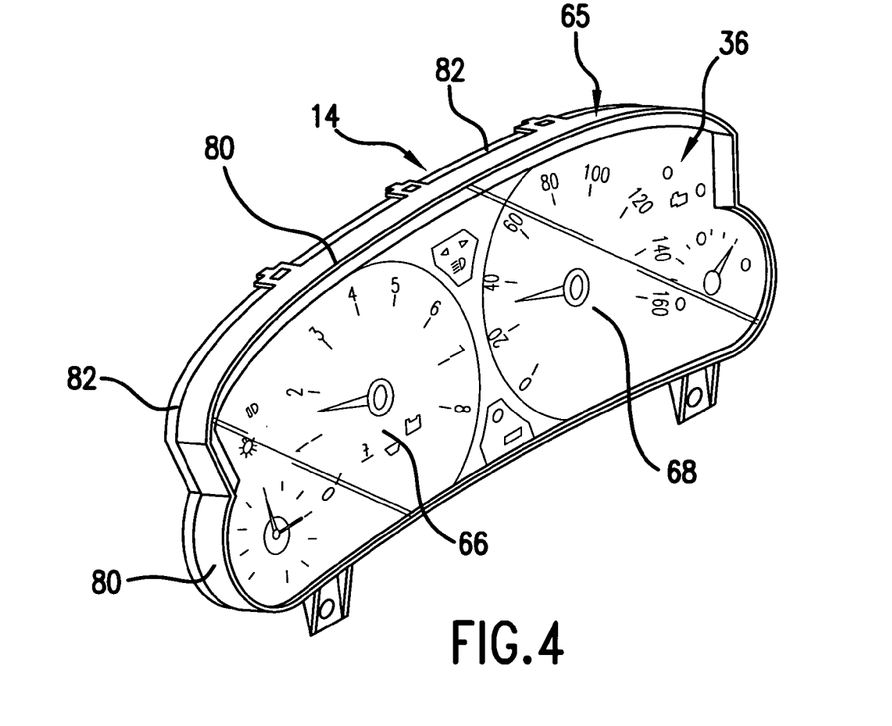
FIG. 4 is a perspective view of an instrument cluster configured in accordance with the present invention.
Figure 5:
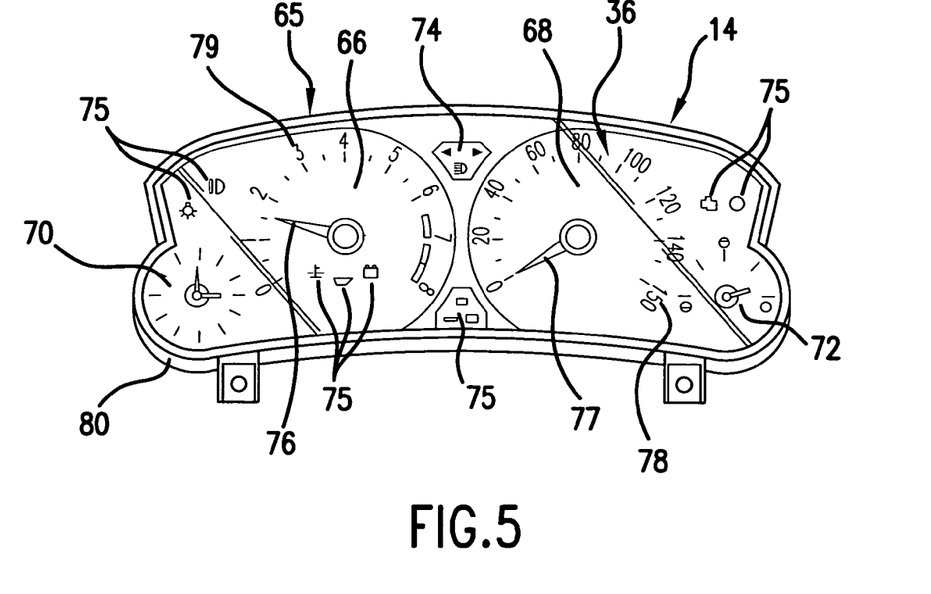
FIG. 5 is a front view of the instrument cluster of FIG. 4.
Figure 6:
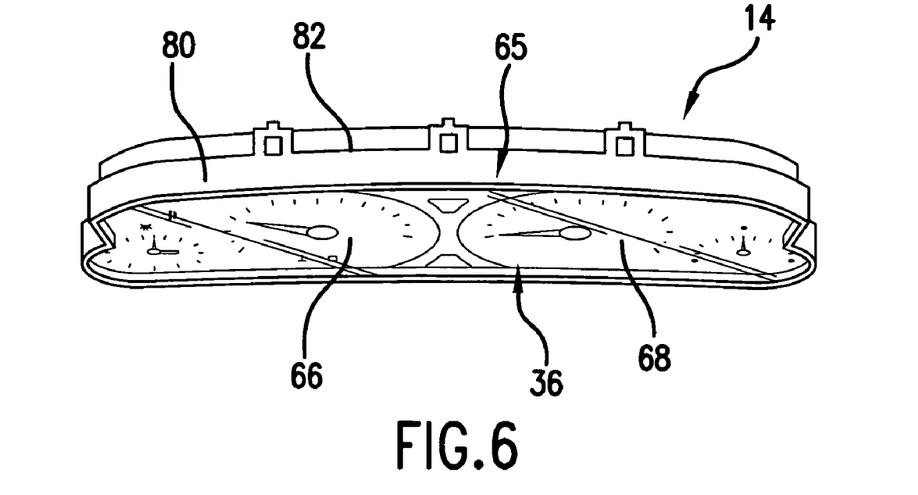
FIG. 6 is a top perspective view of the instrument cluster of FIGS. 4 and 5.
Figure 7:
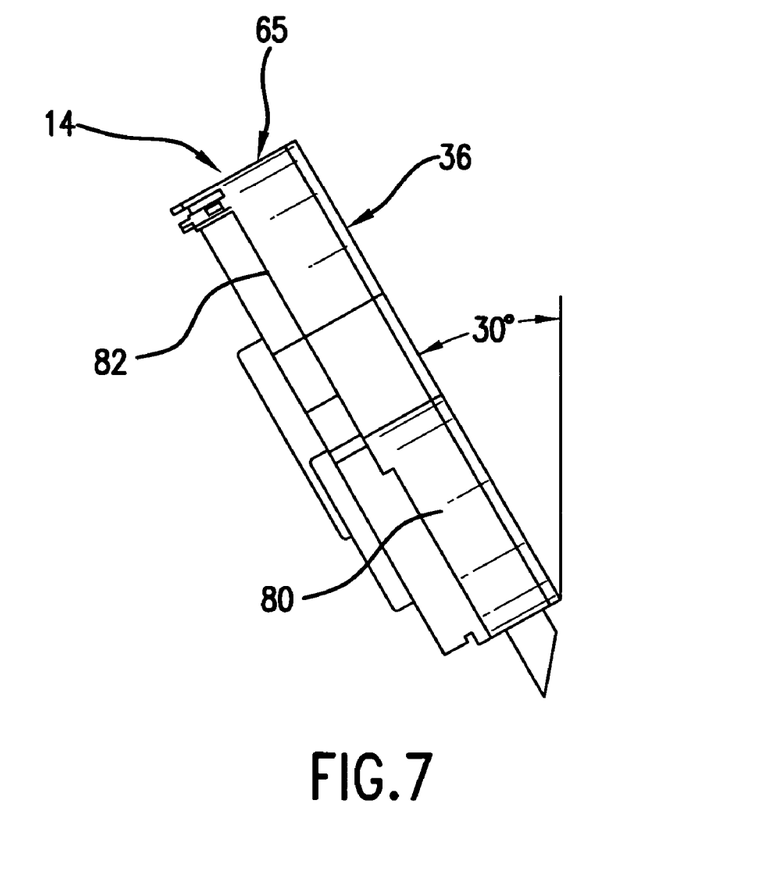
FIG. 7 is a side view of the instrument cluster of FIGS. 4–6.

Indicia 130, which for example comprises numeric indicia 78 and 79 on the speedometer 66 or tachometer 68 of FIG. 4, is placed on the front face 100 of the lens 36 by painting, printing, appliquéing or any other suitable procedure. The indicia 130 absorbs at least a portion of, if not all, illumination 115 passing through the transparent body 103 from behind the indicia, thus differentiating the indicia from the illumination, the illumination providing a lighted background for the indicia.

In FIG. 9, an end portion 132 of the pointer 77 (see FIG. 4) is shown disposed in a recess 133 formed in the transparent body 103 of the lens 36. The pointer 77 also absorbs illumination 115 so that the pointer as well as the indicia 130 stand out against the illumination 120 emerging from the lens 36 and is visible to the driver 30 (FIG. 3).

A recess 134 is formed in the transparent body 103 of the lens 36 so that one of the tale tales 75 painted, printed or appliquéd thereon is visible when back lighted by a separate light source 136 in the form of a separate bulb, LED or the like. Individual light sources 136 are connected to monitors (not shown) of separate parameters and provide separate illumination 137 for each of the tale tales 75.

The lens 36 in one example is molded of transparent plastic with the horizontal grooves 104 molded in the front face 100 of the lens. The grooves 104 are for example about 0.001 inch deep, although any depth may be used as long as the depth is sufficient to cause exterior light to reflect away from the driver's eyes. Examples of transparent plastic materials for making the lens 36 are polycarbonate (LEXAN®) and polybutylene terephthalate.

The thickness "t" of the transparent body 103 comprising the lens 36 is reduced in the recessed portions 133 and 134 that accommodate the pointer 77 and the tale tale 75. This is because illumination 115 for the pointer 37 and tale tale 75 passes through portions of the transparent body 103 beyond the pointer and tale tale and is subject to lateral diffusion which may blur the emerged images of pointers and tale tales if the transparent body is too thick.

Figure 10:
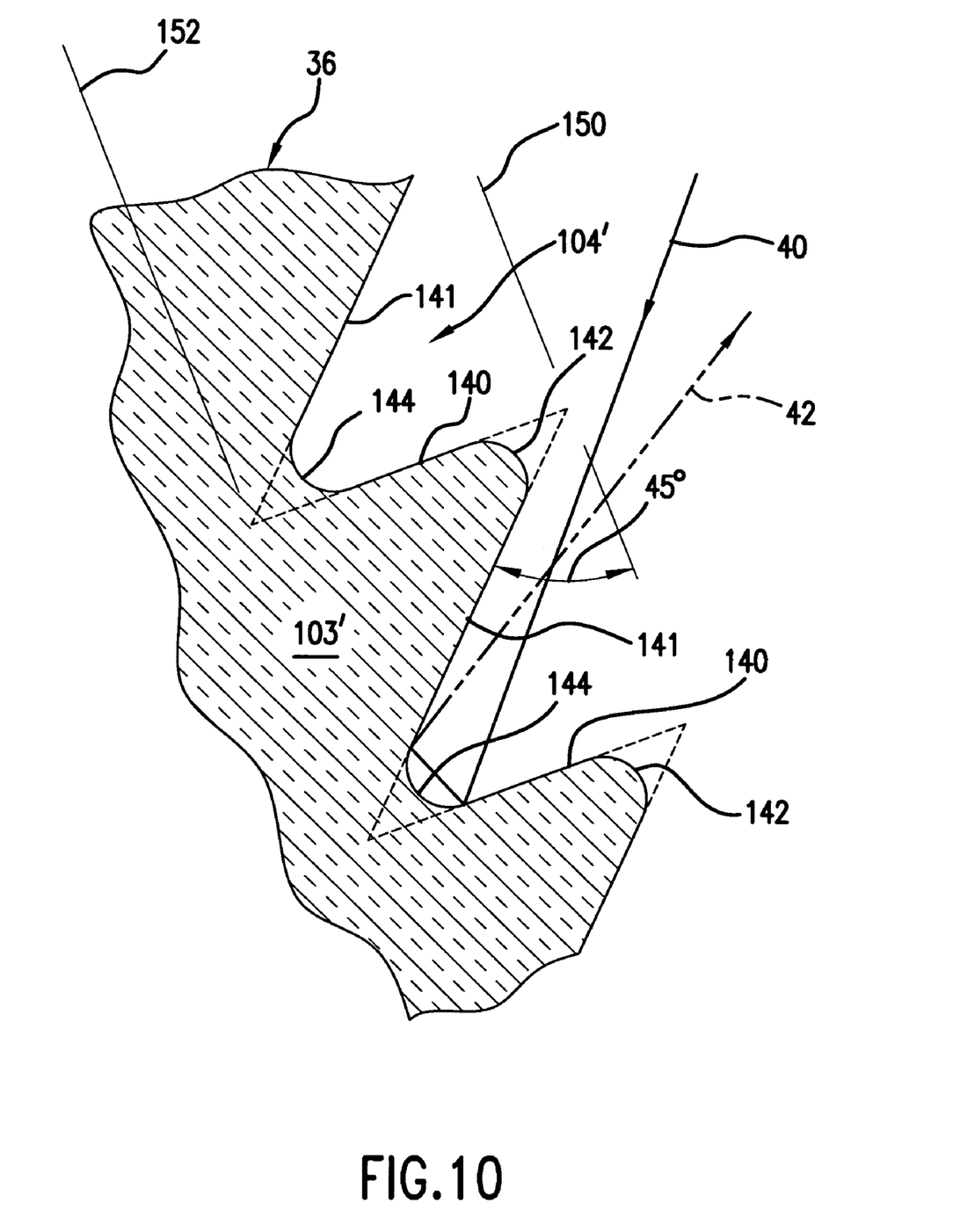
FIG. 10 is a portion of a second embodiment of a lens surface configured in accordance with the principles of the present invention.

Referring now to FIG. 10, there is shown a second embodiment 36' of the lens 36 wherein grooves 104' have converging bottom and top planar walls 140 and 141, respectively, which extend from arcuate peaks 142 to arcuate valley floors 144. The planar walls 140 and 141 converge to imaginary points 146 and 148 lying in parallel planes 150 and 152, respectively, which in the illustrated embodiment are spaced about 0.001 inch apart. The bottom walls 140 of the lens 36 extend horizontally across the lens 36 when the lens is disposed in the vehicle and are perpendicular to the parallel planes 150 and 152. The top walls 141, which extend parallel to the bottom walls 140, are at 45° with respect to the parallel planes 150 and 152, which parallel planes are themselves at 30° with respect to the vertical because the lens 36' is installed in the dash 12 at a 30° angle. As a consequence, incident light beams 40 originating from external sources such as sunlight, passenger compartment lights or exterior road lights are reflected from the walls 140 and 144 away from the driver's head space 34. For illustrative purposes, the reflected sunlight beam 42 is shown being reflected to a location in front of and above the location 34 of the driver's head 32. Indicia 130 (FIGS. 8 and 9), which absorbs illumination 115 passing through the transparent body 103', is distinguished from the illumination 115 and provides an image of the instrument cluster 14 that is substantially free from glare due to external light sources.

From the foregoing description, one skilled in the art can easily ascertain the essential characteristics of this invention, and without departing form the spirit and scope thereof, can make various changes and modifications of the invention to adapt it to various usages and conditions.

We claim:

1. A display for conveying to an observer in an automotive vehicle information relating to monitored parameteres associated with selected conditions occurring in the vehicle; the display comprising:
a case having a front side and a rear side and having therein at least one indicator for conveying information relating to a monitored parameter;
a lens having a front face and a rear face; the lens covering the front side of the case and having a light diffusing surface constructed and arranged to minimize reflections of light from exterior light sources toward an observer in the vehicle, while allowing illumination to pass from behind the rear face of the lens through the lens;
indicia associated with at least one monitored parameter, the indicia beginning disposed on one of the faces of the lens for absorbing at least a portion of the illumination to render the indicia distinct, the indicia cooperating with the indicator to display information relating to the monitored parameter; and
wherein the light diffusing surface is formed in the front face of the lens and comprises an array of adjacent grooves extending substantially horizontally and constructed and arranged to transmit light form behind the lens therethrough as well as to reflect light from in front of the front face away from observer of display.

2. The display of claim 1 wherein the indicia is on the front face of the lens.

3. The display of claim 1 wherein the adjacent grooves are arcuate having reflective portions which reflect sunlight upwardly and downwardly away from the eyes of the observer while transmitting light in substantially parallel beams to the observer.

4. The display of claim 1 further including a mounting arrangement for the display that orients the lens at an acute angle with respect to the vertical.

5. The display of claim 1 wherein the grooves are angular notches.

6. The display of claim 5 wherein the angular notches have planar upper and lower converging walls at least the upper walls being at acute angles with respect to the front face of the lens and the lower walls being at an obtuse angle with respect to the vertical.

7. The display of claim 6 wherein the upper walls are at angles of about 45° with respect to the faces of the lens and the lower walls are substantially perpendicular to the faces of the lens.

8. The display of claim 7 wherein the display includes a mounting arrangement for orienting the lens at an acute angle with respect to vertical.

9. The display of claim 7 wherein the display includes a mounting arrangement for orienting the lens at an acute angle of about 30° with respect to vertical.

10. The display of claim 1 wherein the case has plural indicators, each associated with different parameters and indicia.

11. The display of claim 1 wherein the indicator is a pointer and the indicia is an array of numbers on the front surface of the lens.

12. The display of claim 1 wherein the indicia is a graphic display and the indicator is a cursor.

13. The display of claim 1 wherein the front face of the lens is planar.

14. The display of claim 1 wherein the front and rear faces of the lens define a light transmitting body therebetween of a selected thickness and wherein at least one pointer recess is disposed through the rear face of the lens and into the light transmitting body, the recess having a depth less than the thickness of the light transmitting body.

15. The display of claim 14 further including at least one tale tale recess through the rear face of the lens into the light transmitting body, the tale tale recess having a bottom surface on which tale tale indicia is disposed and a depth less than the thickness of the light transmitting body.

16. A lens which conveys to an observer in an automotive vehicle information from displays in a dash relating to monitored parameters associated with selected conditions occurring in the vehicle, the lens comprising:
a front face and a rear face defining a light transmitting body therebetween;
a light diffusing surface formed in the front face of the lens comprising an array of adjacent grooves extending substantially horizontally and constructed and arranged to transmit light from behind the lens through the light transmitting body as well as to reflect light from in front of the front face away from the observer of the display, and
indicia disposed on the front face of the lens.

17. The lens of claim 16 wherein the adjacent grooves are arcuate having reflective portions which reflect sunlight upwardly and downwardly away from the eyes of the observer while transmitting light in substantially parallel beams to the observer.

18. The lens of claim 16 wherein the adjacent grooves have planar upper and lower converging walls, at least the upper walls being at acute angles with respect to the front face of the lens and the lower walls being at an obtuse angle with respect to the vertical when the lens is installed in the automotive vehicle.

19. The lens of claim 18 wherein the upper walls are at angles of about 45° with respect to the faces of the lens and the lower walls are substantially perpendicular to the faces of the lens.

20. The lens of claim 16 wherein the grooves in the front face of the lens have a depth of about 0.001 inch.

21. The lens of claim 16 wherein the front and rear faces of the lens define a light transmitting body therebetween of a selected thickness and wherein at least one pointer recess is disposed through the rear face of the lens into the light transmitting body, the recess having a depth less than the thickness of the light transmitting body.

22. The lens of claim 16 further including at least one tale tale recess through the rear face of the lens into the light transmitting body, the tale tale recess having a bottom surface on which tale tale indicia is disposed and having a depth less than the thickness of the light transmitting body.

* * * * *